V. W. PAGÉ.
FLYWHEEL.
APPLICATION FILED JUNE 8, 1921.
1,407,568.
Patented Feb. 21, 1922.
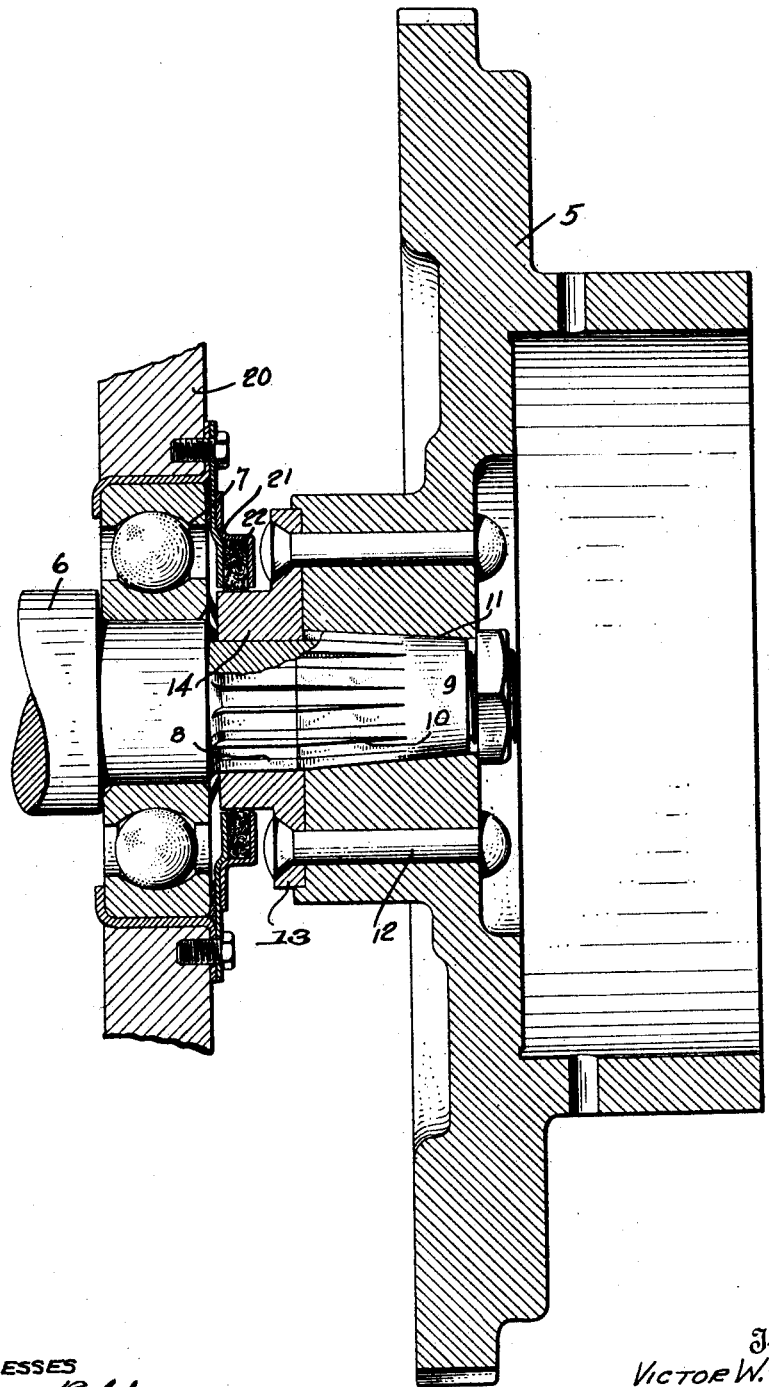
WITNESSES
Inventor
VICTOR W. PAGÉ
By Attorney

UNITED STATES PATENT OFFICE.

VICTOR W. PAGÉ, OF NEW YORK, N. Y.

FLYWHEEL.

1,407,568.     Specification of Letters Patent.     Patented Feb. 21, 1922.

Application filed June 8, 1921. Serial No. 475,930.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Flywheel, of which the following is a full, clear, and exact description.

The present invention relates to new and useful improvements in means for attaching revolving bodies to their driving shafts, and it pertains more particularly to a method of attaching a fly wheel to the crank shaft of an internal combustion motor or an iron traction wheel hub to a tapered drive axle shaft.

It is one of the primary objects of the invention to so construct a fly wheel that the same may be made of relatively non-resistant and soft material, and, at the same time, provide means for keying the fly wheel to the crank shaft of the motor with a member of greater strength than the fly wheel material.

It is a further object of the invention to so construct the fly wheel that the same is automatically centered with respect to the motor crank shaft, the centering means being independent of and separate from the securing means when the fly wheel is machined, thus facilitating machining operations.

With the above and other objects in view, reference is had to the accompanying drawings in which the figure is a sectional view of a fly wheel and its means for attaching the same to a motor crank shaft, the crank shaft being shown in elevation.

Referring more particularly to the drawings the reference character 5 designates a fly wheel and 6 designates the crank shaft, the reference character 7 designating the rear crank shaft bearing. The crank shaft has a reduced extension 8, the free extremity of which is tapered as at 9, and said reduced portion and the tapered extremity are provided with keyways 10, said keyways 10 terminating short of the ends of the tapered extremity of the crank shaft 6. The fly wheel 5 is formed of suitable material less resistant than cast steel or forged steel and the same is provided with a hub opening 11 tapered correspondingly to the taper of the tapered portion 9 of the crank shaft 6.

Secured to the rear face of the fly wheel 5 by means of bolts or other suitable fastening means 12, is a hard metal collar 13, and said hardened collar is provided with a plurality of keys 14 adapted to be received within the keyways 10 of the shaft 6.

The reference character 20 designates the rear wall of the crank case, and said wall 20 forms a support for the bearing 7. Secured to the wall 20 is a fitting 21 adapted to receive a felt or other suitable washer 22 to prevent working rearwardly of lubricant employed in the bearing 7.

By this construction it is apparent that as the fly wheel is attached to the crank shaft 6, the keys 14 of the hardened collar 13 will be received in the keyways 10 of the crank shaft and will serve as the driving connection between the crank shaft and the fly wheel, while the tapered hub opening 11 of the fly wheel 5 will serve to properly center the fly wheel with respect to the crank shaft 6.

I claim:

1. In combination with a shaft having a tapered end portion and a straight portion adjacent thereto, a revolving body adapted to be secured to said shaft, said revolving body having a tapered portion adapted to receive the tapered end of the shaft to center the revolving body with respect to the shaft, and a collar carried by said revolving body and adapted for interengagement with the straight portion of the shaft to secure the revolving body thereto.

2. In combination with a motor crank shaft provided with a tapered end having keyways formed therein, a fly wheel of relatively soft non-resistant material, said fly wheel having a tapered shaft-receiving opening, and a collar rigidly secured to said fly wheel, said collar having keys adapted to be received in the keyways of the crank shaft to provide a driving connection between the crank shaft and the fly wheel.

3. In combination with a motor crank shaft, a fly wheel of relatively soft non-resistant material, said fly wheel having a tapered opening adapted to receive a tapered end of the crank shaft, and a hardened collar rigidly secured to said fly wheel, said hardened collar being provided with projections adapted to be received within keyways formed in the crank shaft whereby the driving connection between the crank shaft and the fly wheel is established without directly connecting the crank shaft to the fly wheel.

4. In combination with a motor crank shaft having a tapered end provided with longitudinal keyways, a fly wheel of relatively soft material having a tapered opening adapted to receive the tapered end of the crank shaft, a collar provided with projections adapted to be received within the keyways of the crank shaft to form a driving connection between the crank shaft and the collar, and means for rigidly attaching the fly wheel to the collar, as and for the purpose set forth.

5. A device of the character described having a shaft formed with a tapered portion and a straight portion, keyways formed in the straight portion and extending throughout a portion of the length of the tapered portion, a fly-wheel adapted to be secured to said shaft, said fly-wheel having an enlarged shaft-receiving portion provided with a tapered opening adapted for engagement with the tapered opening of said shaft to center the fly wheel with respect thereto, a collar carried by the fly wheel, and keys formed integral with said collar and adapted for engagement with the keyways of the straight portion of the shaft to provide a driving connection between the shaft and the fly wheel.

6. A device of the character described comprising a shaft having a straight portion and a tapered portion, a fly wheel formed with a tapered opening adapted to receive the tapered end of the shaft to center the fly wheel with respect to the shaft, and means carried by the fly wheel and adapted to engage the straight portion of the shaft to provide a driving connection between the shaft and the fly wheel, substantially as described.

VICTOR W. PAGÉ.